United States Patent
Stone

[15] 3,667,500
[45] June 6, 1972

[54] LIQUID LEVEL CONTROLLER

[72] Inventor: Leslie F. Stone, Westchester, Ill.

[73] Assignee: The Richardson Company, Melrose Park, Ill.

[22] Filed: Dec. 11, 1969

[21] Appl. No.: 884,301

[52] U.S. Cl..........................................137/386
[51] Int. Cl.........................................F16k 21/18
[58] Field of Search..................137/386, 389, 390, 391, 393, 137/395, 400, 403, 406, 407

[56] References Cited

UNITED STATES PATENTS 3,104,678  9/1963  Cole .................................. 137/403
127,917  6/1872  Painter ............................. 137/386

FOREIGN PATENTS OR APPLICATIONS 795,096  5/1958  Great Britain ........................137/386
821,025  9/1959  Great Britain ........................137/386

Primary Examiner—Henry T. Klinksiek
Assistant Examiner—David R. Matthews
Attorney—John L. Hutchinson, William Lohff and Alan M. Abrams

[57] ABSTRACT

An apparatus for controlling liquid levels for viscous liquids such as printing ink utilizing pneumatic probes and responsive liquid regulating means.

5 Claims, 2 Drawing Figures

INVENTOR
Leslie J. Stone
BY Alan M. Abrams
ATTORNEY

LIQUID LEVEL CONTROLLER

This invention relates to the control of liquid levels and more particularly to an apparatus for automatically controlling the level of viscous materials such as pasty printing inks.

Various devices have been employed to sense and control the level of liquids. Usually, however, these devices are quite complex and generally are not sensitive to measuring the level of highly viscous liquids such as printing inks. Moreover, these complex devices do not readily lend themselves to a quick cleaning particularly when controlling the liquid level of viscous and highly colored materials such as pasty printing inks.

Accordingly, an object of this invention is to provide an apparatus for automatically controlling liquid levels. Another object is to provide such an apparatus which is simple in construction yet particularly sensitive to the level of highly viscous liquids and moreover can be readily and simply cleaned. A further object is to provide such an apparatus with automatic safety stopping for associated liquid processing equipment in response to low liquid level.

These and other objects of this invention will be apparent from the further following detailed description thereof as well as from the attached drawings.

Figure 1:
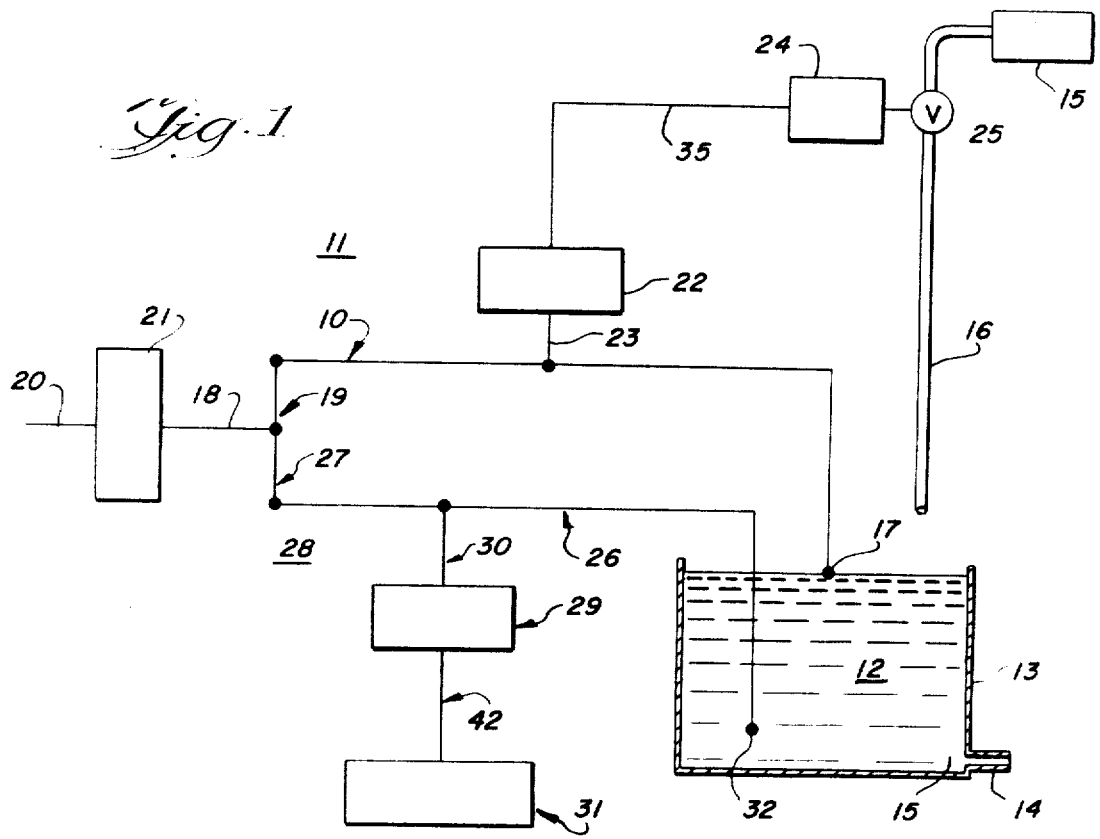
FIG. 1 is a view of a liquid containing vessel in cross-section in combination with the schematic layout of a liquid level control apparatus according to this invention.

In specific reference to FIG. 1, the apparatus of this invention in simple embodiment comprises in combination a probe 10 which communicates with liquid regulating means 11 and extends into the liquid 12 contained within a vessel 13 to a predetermined high level. In automatic operation of this apparatus, when the liquid level is below the high level, the probe 10 senses this condition and actuates the liquid regulating means 11 to cause the addition of liquid thus raising the liquid level. When the liquid level exceeds the high level as a result of the added liquid, the probe 10 again senses this condition and actuates the liquid regulating means 11 to stop the addition of the liquid 12. This cycle automatically repeats to maintain the desired height or level for the liquid 12.

In FIG. 1, the probe 10 extends into the liquid 12 to a predetermined high level. The liquid 12 is illustrated for convenience in FIG. 1 as contained within a cylindrical vessel 13 shown in cross-section. The apparatus of this invention, however, can be employed to automatically control the level of liquids maintained within any type of container, for example, even a feed-pool maintained in such devices as printing presses or roller mills. A specific illustration of the latter is described in my co-pending application Ser. No. 884,057, filed Dec. 11, 1969. The liquid 12 as shown maintained in the vessel 13 can, in general, include a wide variety of liquids. However, because the apparatus of this invention, as more fully explained hereinafter, operates most effectively with viscous liquids, it is preferred that the liquid 12 be of a particularly viscous consistency such as that of pasty printing inks.

The level of the liquid 12, for example, a pasty printing ink, within the vessel 13 is not constant and decreases as the liquid 12 is withdrawn via an exit port 14. This exit port 14, illustrated for convenience, has an entrance opening 15 at the bottom of the vessel 13 which symbolizes withdrawal of the liquid 12. The liquid 12 can flow via the exit port 14 to any type of associated equipment, usually motor driven processing equipment. For example, in the case of pasty printing inks, the liquid 12 can pass to a printing press.

As the level of the liquid 12 falls below its predetermined high level, the probe 10 senses this condition and in response actuates the liquid regulating means 11 to add replenishing liquid from a liquid supply source 15 via the feed-pipe 16, generally at an addition rate in excess of the withdrawal rate via the exit port 14. As the level of the liquid 12 rises due to the addition of liquid and when the level exceeds the predetermined high level, the probe 10 again senses this condition and actuates the liquid regulating means 11 to stop the liquid addition via the feed-pipe 16.

The probe 10 in simple embodiment comprises a pneumatic hollow tube of relatively small diameter and of suitable construction material through which air under a relatively low pressure freely flows. The probe 10 can be of unitary construction or suitably include flexible joints (not shown) so as to allow the probe 10 to be universally moved to any elevation or position in the liquid 12 so that a terminal opening 17 of the probe 10 corresponds to a particularly desired high level for such liquid 12. Air is charged to the probe 10 via air conduits 18 and 19 from air pressure supply conduit 20 controlled by reducing air valve 21. In addition to controlling admittance of air to the probe 10, the air valve 21 also simultaneously reduces the air to a very low pressure in the order of approximately 1 pound per square inch. Alternatively, if such a pressure reduction function is not desired for air valve 21, then a suitable orifice restriction (not shown) can be located internal the conduit 19 leading to the probe 10 downstream from the valve 21 to achieve the desired low air pressure.

When the liquid height or level of the liquid 12 is below the predetermined high level, the air passing through the probe 10 exits freely out of the terminal opening 17 thus maintaining the air pressure in the probe 10 within the low range or at a low pressure condition set by the air valve 21. This low air pressure condition within the probe 10 actuates the liquid regulating means 11 as previously described to cause the addition of more liquid 12 via feed-pipe 16.

The liquid regulating means 11 conveniently include a pressure actuated switch 22 communicating with the probe 10 through air conduit 23 and a solenoid 24 controlling liquid valve 25 which when open, allows liquid 12 to flow through the feed-pipe 16 from liquid supply source 15. In operation of the liquid regulating means 11, when the air pressure in the probe 10 is at a low air pressure condition signifying that the terminal opening 17 of the probe 10 is free of any liquid covering and hence that the liquid level is below the desired high level, the pressure switch 22 is actuated. This pressure switch 22 is of conventional design and has internal switch contacts (not shown) which are adapted to close at a particular low pressure and to open at a higher pressure. The contacts of the pressure sensitive switch 22 are in series with the solenoid 24 of conventional design via lead 35 and when the low pressure condition within the probe 10 closes the pressure sensitive switch 22, the solenoid 24 is energized. Upon being so energized, the solenoid 24 opens the valve 25 allowing liquid 12 to flow via feed-pipe 16 and raise the liquid level.

The reverse of this control procedure occurs when the level of the liquid 12 rises above the high level determined by the position or elevation of the terminal opening 17 of the probe 10. When the liquid level rises above the high level, the terminal opening 17 is closed or sealed by the liquid 12 whereupon the air pressure within the probe 10 increases and ultimately reaches a high pressure or high pressure condition which actuates the pressure switch 22 to open its contacts and thus deenergize the solenoid 24. Upon being so deenergized, the solenoid 24 moves the valve 25 to a closed position thereby stopping the addition of liquid 12 via feed-pipe 16. This control cycle repeats continuously as the level of the liquid 12 rises and falls thus maintaining and controlling the desired height or level of the liquid 12.

Because the liquid 12 in a preferred embodiment is quite thick or viscous, it readily seals the terminal opening 17 of the probe 10 thus preventing any substantial release of the air from the probe 10 by bubbling through the liquid. Thus, the pressure within the probe 10 quickly rises to a high pressure condition to actuate the pressure switch 22. This renders the liquid regulating means 11 quite sensitive to any rise of the liquid level. To insure that the probe 10 is equally sensitive to any lowering of liquid 12, the minimum air pressure maintained within the probe 10 by means of air valve 21 and its associated internal orifice restrictions, if any, should be sufficient so as to blow-off any liquid 12 adhering to the terminal opening 17 of the probe 10 when the liquid level falls below the terminal opening 17. This necessary clearing of the terminal opening 17 is, however, automatically assisted by the high pressure condition of the probe 10 created by the sealing action of the liquid 12. For example, when the liquid level falls, the high pressure within the probe 10 will provide a surge of pressure to purge the terminal opening 17 and remove any adhering liquid.

One particularly advantageous feature of the probe 10 is that, because of its simple structure, it can be readily and quickly cleaned by simple wiping or washing to remove any adhering liquid. This is especially desirable when controlling the level of various liquids where contamination of one liquid with another is a serious problem. One example of this cross-contamination is the color contamination of different colored batches of printing inks.

As an associated and preferred feature of the apparatus of the invention, a second probe 26 extends into the liquid 12 to a predetermined low level. This low level corresponds to a predetermined liquid height or level considered to be the minimum safe level for liquid 12. This low level probe 26 is analogous to the high level probe 10 and air under relatively low pressure is admitted to probe 26 from air regulating valve 21 via conduit 18 and conduit 27 having an internal restriction (not shown) to prevent any pressure condition within probe 26 from affecting any pressure condition within the probe 10. This probe 26 is connected to alarm and motor regulating means 28 which include a pressure sensitive switch 29 communicating with the probe 26 via air conduit 30. Pressure sensitive switch 29 is similar to pressure sensitive switch 22 and its switch contacts (not shown) are set so that the switch 29 is in open position at a particular high pressure condition within the probe 26 and closed at a particularly low pressure condition. The contacts of pressure sensitive switch 29 as more fully explained hereinafter, are in series with a relay having contacts in series with the motor means 31 which drives the associated equipment (not shown) such as a printing press.

When the liquid 12 is above the low level determined by the position of the terminal opening 32 of the probe 26, the terminal opening is closed by the liquid 12 thereby creating a high pressure condition within the probe 26. This high pressure condition maintains the pressure sensitive switch 29 in an open position which allows the motor means 31 to remain energized and drive the associated equipment. When, however, the liquid level falls below the desired low level, the terminal opening 32 of the probe 26 is uncovered thus causing the pressure within the probe 26 to fall to a low pressure condition. Upon the lowering of the air pressure in the probe 26, the pressure switch 29 contacts close, thus deenergizing the motor means 31 and thereby stopping the associated equipment. The employment of this low level probe 26 thus automatically prevents any associated equipment from running in a dry state as the result of an insufficient supply of liquid 12.

Figure 2:
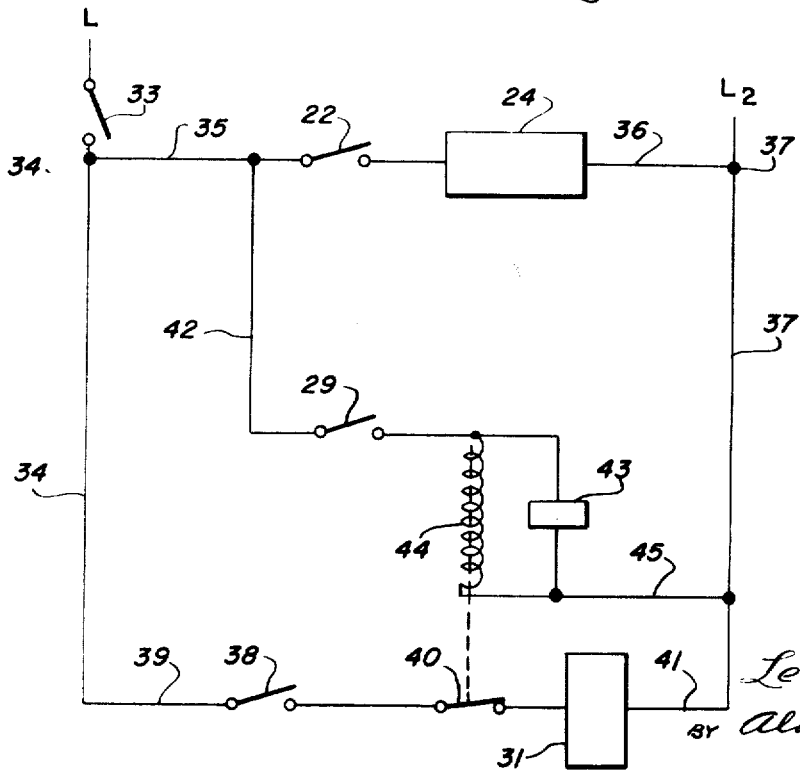
FIG. 2 is a diagrammatic layout of a control circuit for the apparatus according to this invention.

The liquid regulating means 11 and the alarm and motor regulating means 28 of the apparatus are preferably electrically operated. The wiring interconnecting the various components with the apparatus of this invention are not completely shown in FIG. 1 for purposes of convenience. The electrical operation of these components is best described in reference to FIG. 2.

Assuming at the start of any liquid control operation, the valve 25 is manually opened allowing the liquid 12, for example printing ink, to flow into the container 13 to a level above the terminal opening 32 of probe 26 at an addition rate in excess of the withdrawal rate of the liquid 12 through the exit port 14 as the liquid 12 feeds the associated equipment (not shown). A line switch 33 is then moved to a closed position which connects the apparatus of this invention to a suitable power source, L1 and L2, for example, 110 volts, 60 cycles. On the closing of the line switch 33, a circuit is completed from lead 34 via lead 35 and pressure sensitive switch 22, when closed, to energize solenoid 24 having returned to source via leads 36 and 37. As previously explained, when solenoid 24 is energized, the valve 25 controlling the addition of liquid 12 via feed-pipe 16 is open.

Motor switch 38 is then moved to a closed position thus completing via leads 34 and 39 and normally closed switch contact 40, an energizing circuit through motor means 31 having returned to source via leads 41 and 37. The motor means 31 being so energized, then operate the associated equipment, for example a printing press, and a portion of the liquid 12 such as ink is removed from the vessel 13 at a rate slower than the addition rate of the liquid 12 from he feed-pipe 16. As the level of the liquid 12 rises above the terminal opening 17 of probe 10 by the addition of the liquid, the terminal opening 17 is closed by the sealing action of the liquid 12 thereby increasing the pressure within the probe 10 to a high pressure condition. This high pressure condition actuates the pressure sensitive switch 22, opening such switch and thereby interrupting the energizing circuit to the solenoid 24. Upon being deenergized, the solenoid 24, by control of valve 25, stops the addition of liquid via feed-pipe 16. As previously explained, the reverse operation occurs when the liquid level falls below the terminal opening 17 of the probe 10. This creates a low pressure condition within the probe 10 which actuates the pressure sensitive switch 22 to move to a closed position which again completes an energizing circuit to solenoid 24 causing once again the addition of the liquid 12 via the feed-pipe 16.

With the level of the liquid 12 above the low level determined by the elevation of the terminal opening 32 of the probe 26, the air pressure in such probe is maintained at a high pressure condition which maintains the pressure sensitive switch 29 in open position. When the level should fall before the terminal opening 32 of the probe 26, for example, when the liquid supply in the vessel 13 is totally exhausted, the high pressure condition within the probe 26 is released thereby causing a low pressure condition which actuates the pressure sensitive switch 29 to a closed position. When the switch 29 is in a closed position, a circuit is completed via leads 35 and 42 to energize in parallel an alarm 43 and a time delay relay 44 having a return to source via leads 45 and 37. Upon being energized, the alarm 43 associated, for example, with a bell or a light (not shown) signals the operator to shut down the associated equipment by opening motor switch 38 or line switch 33. As a feature of automatic safety, should the operator not respond to the alarm 43, the time delay relay 44, after a suitable time delay upon being energized, opens its contact switch 40 which is in series with the motor means 31. Upon the opening of the contact switch 40, the energizing circuit to the motor means 31 is interrupted thereby deenergizing the motor means 31 and stopping the associated equipment.

I claim:

1. An apparatus for controlling the level of liquids in vessels which includes a first pneumatic probe extending into the liquid to a predetermined high level and communicating with liquid regulating means in combination with an air pressure supply disposed outside the vessel charging air through the probe and into the liquid, the probe being opened when the liquid level is below the high level to actuate the liquid regulating means to add liquid to the vessel and the probe being closed by the liquid when the liquid level is above the high level to actuate the liquid regulating means to stop the addition of liquid to the vessel, said apparatus including a second pneumatic probe extending into the liquid to a predetermined low level and communicating with alarm and control means in combination with an air pressure supply disposed outside the vessel charging air through the probe and into the liquid, the second probe being closed by the liquid when the liquid level is above the low level and the probe being opened when the liquid level is below the low level to actuate the alarm and control means, said alarm and control means being electrically operated and including a pressure-sensitive switch communicating with the second probe, such switch being actuated to close by a low pressure condition within the probe when the liquid level is below the low level and such switch being actuated to open by a high pressure condition within the probe when the liquid level is above the low level.

2. The apparatus of claim 1 wherein the pressure sensitive switch is in series with an alarm and a relay, such relay having contacts in series with motor means, and normally being closed to complete an energizing circuit to such motor means whereby a circuit is completed when the pressure sensitive switch is closed to actuate the alarm and energize the relay thereby opening its contacts and interrupting the circuit to the motor means to deenergize such motor means.

3. The apparatus of claim 2 wherein the relay is a time delay relay which upon being energized delays for a period before opening its contacts.

4. The apparatus of claim 1 wherein the liquid regulating means are electrically operated and include a pressure sensitive switch communicating with the probe, such switch being actuated to close by a low pressure condition within the probe when the liquid level is below the high level and such switch being actuated to open by a high pressure condition within the probe when the liquid is above the high level.

5. The apparatus of claim 4 wherein the pressure sensitive switch is in series with a solenoid controlling a valve for adding liquid, such solenoid being energized when the switch is closed to open the valve thereby adding liquid and such solenoid being deenergized when the switch is open to close the valve and stop the addition of liquid.

* * * * *